United States Patent
Moncada-Elias et al.

(10) Patent No.: US 8,446,819 B2
(45) Date of Patent: *May 21, 2013

(54) SYSTEM AND METHOD FOR DETECTING AND ISOLATING A REMOTE LOOP

(75) Inventors: Jordi Moncada-Elias, Milpitas, CA (US); Rajiv Ramanathan, Cupertino, CA (US)

(73) Assignee: Foundry Networks, LLC, San Jose, CA (US)

( * ) Notice: Subject to any disclaimer, the term of this patent is extended or adjusted under 35 U.S.C. 154(b) by 106 days.

This patent is subject to a terminal disclaimer.

(21) Appl. No.: 13/090,118

(22) Filed: Apr. 19, 2011

(65) Prior Publication Data

US 2012/0106361 A1    May 3, 2012

Related U.S. Application Data

(63) Continuation of application No. 12/466,363, filed on May 14, 2009, now Pat. No. 7,944,816, which is a continuation of application No. 10/632,591, filed on Aug. 1, 2003, now Pat. No. 7,558,205.

(51) Int. Cl.
*H04J 1/16* (2006.01)

(52) U.S. Cl.
USPC .......................... 370/224; 370/249

(58) Field of Classification Search
USPC ................. 370/224, 249, 222, 223
See application file for complete search history.

(56) References Cited

U.S. PATENT DOCUMENTS

| | | | |
|---|---|---|---|
| 5,761,435 A | 6/1998 | Fukuda et al. | |
| 5,878,232 A | 3/1999 | Marimuthu | |
| 5,959,968 A | 9/1999 | Chin et al. | |
| 5,995,486 A | 11/1999 | Iliadis | |
| 6,163,543 A | 12/2000 | Chin et al. | |
| 6,202,114 B1 | 3/2001 | Dutt et al. | |
| 6,204,114 B1 | 3/2001 | Clampitt et al. | |
| 6,262,977 B1 | 7/2001 | Seaman et al. | |
| 6,282,589 B1 | 8/2001 | Porterfield et al. | |
| 6,304,575 B1 | 10/2001 | Carroll et al. | |
| 6,628,624 B1 | 9/2003 | Mahajan et al. | |
| 6,628,661 B1 | 9/2003 | Goldman et al. | |
| 6,658,004 B1 | 12/2003 | Kadansky et al. | |
| 6,697,339 B1 | 2/2004 | Jain | |
| 6,717,922 B2 | 4/2004 | Hsu et al. | |
| 6,766,482 B1 | 7/2004 | Yip et al. | |
| 6,795,403 B1 | 9/2004 | Gundavelli | |

(Continued)

OTHER PUBLICATIONS

Office Action in U.S. Appl. No. 12/878,973, mailed Oct. 26, 2011.

(Continued)

*Primary Examiner* — Andrew Lee
(74) *Attorney, Agent, or Firm* — Nixon Peabody LLP; John P. Schaub

(57) ABSTRACT

A system and method are provided for enabling a first network to detect a loop in a second network connected thereto. The first network runs a first instance of a Spanning Tree Protocol and the second network runs either a different instance or no instance. The method includes sending a Remote Loop Detection Packet ("RLDP") from the ports in bridges of the first network which are connected to the second network. The RLDP includes identifiers such as the source bridge, port and VLAN. The system and method further includes checking for receipt of the RLDP on the same bridge which sent the RLDP. If such a receipt occurs, a loop is detected and one of the ports of the receiving/sending bridge is blocked.

22 Claims, 6 Drawing Sheets

U.S. PATENT DOCUMENTS

| | | | |
|---|---|---|---|
| 6,801,506 | B1 | 10/2004 | Dey |
| 6,813,250 | B1 | 11/2004 | Fine et al. |
| 6,898,189 | B1 | 5/2005 | Di Benedetto et al. |
| 6,937,576 | B1 | 8/2005 | Di Benedetto et al. |
| 6,985,449 | B2 | 1/2006 | Higashiyama |
| 7,003,705 | B1 | 2/2006 | Yip et al. |
| 7,061,858 | B1 | 6/2006 | Di Benedetto et al. |
| 7,126,923 | B1 | 10/2006 | Yang et al. |
| 7,154,861 | B1 | 12/2006 | Merchant et al. |
| 7,171,504 | B2 | 1/2007 | Ishii |
| 7,209,435 | B1 | 4/2007 | Kuo et al. |
| 7,286,491 | B1 | 10/2007 | Smith |
| 7,558,205 | B1 | 7/2009 | Moncada-elias et al. |
| 7,564,858 | B1 | 7/2009 | Moncada-elias et al. |
| 7,586,856 | B1 | 9/2009 | Thottakkara et al. |
| 7,606,229 | B1 | 10/2009 | Foschiano et al. |
| 7,620,693 | B1 | 11/2009 | Mott et al. |
| 7,627,654 | B2 | 12/2009 | Ramanathan et al. |
| 7,822,049 | B1 | 10/2010 | Moncada-elias et al. |
| 7,848,264 | B1 | 12/2010 | Gai et al. |
| 7,856,490 | B2 | 12/2010 | Ramanathan et al. |
| 2002/0154606 | A1 | 10/2002 | Duncan et al. |
| 2002/0159398 | A1 | 10/2002 | Yamada et al. |
| 2002/0181413 | A1 | 12/2002 | Kitagawa |
| 2003/0142680 | A1 | 7/2003 | Oguchi |
| 2003/0169694 | A1 | 9/2003 | Seaman |
| 2003/0223379 | A1 | 12/2003 | Yang et al. |
| 2003/0223442 | A1 | 12/2003 | Huang et al. |
| 2004/0081171 | A1 | 4/2004 | Finn |
| 2004/0255050 | A1 | 12/2004 | Takehiro et al. |
| 2005/0013260 | A1 | 1/2005 | Ramanathan et al. |
| 2005/0259597 | A1 | 11/2005 | Benedetto et al. |
| 2006/0206656 | A1 | 9/2006 | Di Benedetto et al. |
| 2006/0233186 | A1 | 10/2006 | Portolani et al. |
| 2008/0037428 | A1 | 2/2008 | Nation et al. |
| 2009/0225668 | A1 | 9/2009 | Moncada-elias et al. |
| 2010/0195661 | A1 | 8/2010 | Thottakkara |
| 2011/0064001 | A1 | 3/2011 | Moncada-elias et al. |

OTHER PUBLICATIONS

Abdelhalim, A., "IP/MPLS-Based vs. Layer-2," Whitepaper, Mar. 22, 2002, 16 pages.
Cobb, J. A., "Convergent Multi-Path Routing," Whitepaper, International Conference on Network Protocols, 2000, 10 pages.
Finn, N., "Spanning the World With Ethernet," Powerpoint Presentation, 2001, 132 pages.
ANS/IEEE Std 802.id, 1998 Edition, "Part 3: Media Access Control (MAC) Bridges," Adopted by the ISO/IEC 15802-3:1998, Sponsor LAN/MAN Standards Committee of the IEEE Computer Society, 374 pages.
Office Action in U.S. Appl. No. 10/456,756, mailed Mar. 21, 2007.
Office Action in U.S. Appl. No. 10/456,756, mailed Oct. 18, 2007.
Office Action in U.S. Appl. No. 10/456,756, mailed May 7, 2008.
Office Action in U.S. Appl. No. 10/456,756, mailed Jan. 27, 2009.
Office Action in U.S. Appl. No. 10/456,756, mailed Jul. 20, 2009.
Notice of Allowance in U.S. Appl. No. 10/456,756, mailed Sep. 17, 2009.
Office Action in U.S. Appl. No. 10/632,591, mailed Jun. 26, 2007.
Office Action in U.S. Appl. No. 10/632,591, mailed Mar. 5, 2008.
Notice of Allowance in U.S. Appl. No. 10/632,591, mailed Aug. 4, 2008.
Notice of Allowance in U.S. Appl. No. 10/632,591, mailed Jan. 12, 2009.
Notice of Allowance in U.S. Appl. No. 10/632,591, mailed Mar. 13, 2009.
Notice of Allowance in U.S. Appl. No. 10/632,591, mailed Apr. 30, 2009.
Office Action in U.S. Appl. No. 10/632,635, mailed Sep. 19, 2007.
Final Office Action in U.S. Appl. No. 10/632,635, mailed Mar. 17, 2008.
Office Action in U.S. Appl. No. 10/632,635, mailed Dec. 3, 2008.
Notice of Allowance in U.S. Appl. No. 10/632,635, mailed May 20, 2009.
Office Action in U.S. Appl. No. 11/246,945, mailed Jun. 30, 2008.
Office Action in U.S. Appl. No. 11/246,945, mailed Dec. 30, 2008.
Office Action in U.S. Appl. No. 11/246,945, mailed Jul. 7, 2009.
Office Action in U.S. Appl. No. 11/246,945, mailed Mar. 30, 2010.
Notice of Allowance in U.S. Appl. No. 11/246,945, mailed Sep. 2, 2010.
Office Action in U.S. Appl. No. 12/580,230, mailed Aug. 19, 2010.
Office Action in U.S. Appl. No. 12/466,363, mailed Sep. 22, 2010.
Notice of Allowance in U.S. Appl. No. 12/580,230, mailed Oct. 6, 2010.
Supplemental Notice of Allowance in U.S. Appl. No. 12/580,230, mailed Nov. 1, 2010.
U.S. Appl. No. 12/939,115, filed Nov. 3, 2010.
Office Action in U.S. Appl. No. 12/466,363, mailed Dec. 15, 2010.
Notice of Allowance in U.S. Appl. No. 12/466,363, mailed Apr. 1, 2011.
Office Action in U.S. Appl. No. 12/878,973, mailed Jul. 6, 2011.
Definition of "to" from Merriam-Webster.com, retrieved Jul. 28, 2011.
Definition of "toward" from Merriam-Webster.com, retrieved Jul. 28, 2011.
Definition of "to" from Dictionary.com, retrieved Jul. 28, 2011.
Definition of "toward" from Dictionary.com, retrieved Jul. 28, 2011.
Definition of "to" from Answers.com, retrieved Jul. 28, 2011.
Definition of "toward" from Answers.com, retrieved Jul. 28, 2011.
Office Action in U.S. Appl. No. 12/939,115, mailed Aug. 17, 2012.
Notice of Allowance in U.S. Appl. No. 12/878,973, mailed Aug. 31, 2012.
Office Action in U.S. Appl. No. 12/878,973, mailed Mar. 8, 2012.

SYSTEM AND METHOD FOR DETECTING AND ISOLATING A REMOTE LOOP

CROSS-REFERENCE TO RELATED APPLICATIONS

This application is a continuation of Ser. No. 12/466,363, filed on May 14, 2009, which is a continuation of prior U.S. patent application Ser. No. 10/632,591, entitled "System and Method for Detecting and Isolating a Remote Loop", filed on Aug. 1, 2003, now U.S. Pat. No. 7,558,205.

FIELD OF THE INVENTION

The invention relates to network configuration protocols, and, more particularly, to protocols which enable remote loop detection and allow for isolation of those remote loops.

BACKGROUND OF THE INVENTION

A computer network typically comprises a plurality of interconnected devices, These devices include any network device, such as a server or end station, that transmits or receives data frames. A common type of computer network is a local area network ("LAN") which typically refers to a privately owned network within a single building or campus. LANs may employ a data communication protocol, such as Ethernet or token ring, that defines the functions performed by the data link and physical layers of a communications architecture in the LAN. In many instances, several LANs are interconnected by point-to-point links, microwave transceivers, satellite hook-ups, etc. to form a wide area network ("WAN"), that may span an entire country or continent.

One or more intermediate network devices are often used to couple LANs together and allow the corresponding entities to exchange information. For example, a bridge may be used to provide a bridging function between two or more LANs. Alternatively, a switch may be utilized to provide a switching function for transferring information among a plurality of LANs or end stations. In effect, a switch is a bridge among more than 2 networks or entities. The terms "bridge" and "switch" will be used interchangeably throughout this description. Bridges and switches are typically devices that operate at the Data Link layer ("layer 2") of the Open Systems Interconnection ("OSI") model. Their operation is defined in the American National Standards Institute ("ANSI") Institute of Electrical and Electronics Engineers ("IEEE") 802.1D standard. A copy of the ANSI/IEEE Standard 802.1D, 1998 Edition, is incorporated by referenced herein in its entirety.

Telecommunication traffic among network devices is divided into seven layers under the OSI model and the layers themselves split into two groups. The upper four layers are used whenever a message passes to or from a user. The lower three layers are used when any message passes through the host computer, whereas messages intended for the receiving computer pass to the upper four layers. "Layer 2" refers to the data-link layer, which provides synchronization for the physical level and furnishes transmission protocol knowledge and management.

Networks may be designed using a plurality of distinct topologies—that is the entities in the network may be coupled together in many different ways. Referring to FIGS. 1-3, there is shown different examples of "ring" topologies. A ring topology is a network configuration formed when "Layer 2" bridges are placed in a circular fashion with each bridge having two and only two ports belonging to a specific ring. FIG. 1 shows a single ring 50 having bridges 52 connected by paths 54. Each bridge 52 in ring 50 in FIG. 1 has two ports 52a and 52b belonging to the ring. FIG. 2 shows two adjacent rings, 50a and 50b, with a single bridge 56 having two ports 56a, 56b belonging to each ring.

In FIGS. 1 and 2, no paths or bridges are shared among rings. In FIG. 3 two rings 50c and 50d are connected and share two bridges 58, 60. Bridge 58 has two ports 58a and 58b which each uniquely belong to only one ring, rings 50c and 50d respectively. Bridge 58 also has one port 58c connected to a path which is shared by both rings 50c and 50d. If rings are assigned different priority levels, a port such as 58c connected to the shared link assumes the priority value of the higher priority ring, and ports 58a and 58b in shared bridge 58 and port 60a in bridge 60 connected to the lower priority ring are deemed to be customer (or lower priority) ports. The use of a shared link between shared bridges 58, 60 allows for the connection of rings and the growth of a larger network from smaller ring components; however, the shared link also presents difficulties since its failure affects both rings 50c and 50d.

Ring topologies shown in FIGS. 1-3 present Layer 2 traffic looping problems. As illustrated in FIG. 4, in a single ring topology, data traffic can circulate around in either direction past their origination and thus create repetition of messages. For example, data traffic may originate in bridge 51, travel counter-clockwise in the ring, pass bridge 57 and return to bridge 51; this is called a loop. Loops are highly undesirable because data frames may traverse the loops indefinitely. Furthermore, because switches and bridges replicate (i.e., flood) frames whose destination port is unknown or which are directed to broadcast or multicast addresses, the existence of loops may cause a proliferation of data frames that effectively overwhelms the network.

To prevent looping, one of the paths in the ring is blocked, as shown in FIG. 4, by blocking data traffic in one of the ring ports—in this case, either port 51a or 57a. The port is deemed to be in a "blocking" state, in which it does not learn or forward incoming or outgoing traffic.

A network may be segregated into a series of logical network segments. For example, any number of physical ports of a particular switch may be associated with any number of other ports by using a virtual local area network ("VLAN") arrangement that virtually associates the ports with a particular VLAN designation. Multiple ports may thus form a VLAN even though other ports may be physically disposed between these ports.

The VLAN designation for each local port is stored in a memory portion of the switch such that every time a message is received by the switch on a local port the VLAN designation of that port is associated with the message. Association is accomplished by a flow processing element which looks up the VLAN designation in the memory portion based on the local port where the message originated.

Most networks include redundant communications paths so that a failure of any given link or device does not isolate any portion of the network. For example, in the ring networks shown in FIGS. 1-4, if communication is blocked preventing data from flowing counter-clockwise, the data may still reach its destination by moving counter-clockwise. The existence of redundant links, however, may also cause the formation of loops within the network.

To avoid the formation of loops, many network devices execute a "spanning tree algorithm" that allows the network devices to calculate an active network topology which is loop-free (e.g. has a needed number of ports blocked) and yet connects every element in every VLAN within the network. The IEEE 802.1D standard defines a spanning tree protocol ("STP") to be executed by 802.1D compatible devices (e.g., bridges, switches, and so forth). In the STP, Bridge Protocol Data Units ("BPDUs") are sent around the network and are used to calculate the loop free network technology.

Other available protocols include that shown and described in now pending NETWORK CONFIGURATION PROTOCOL AND METHOD FOR RAPID TRAFFIC RECOVERY AND LOOP AVOIDANCE IN RING TOPOLOGIES, filed Mar. 4, 2002, Ser. No. 10/090,669 and now pending SYSTEM AND METHOD FOR PROVIDING NETWORK ROUTE REDUNDANCY ACROSS LAYER 2 DEVICES, filed Apr. 16, 2002, Ser. No. 10/124,449. The entirety of these applications are hereby incorporated by reference.

All of the current protocols require devices in a network to be protocol-aware. That is, each device must be able to run and understand the protocol that is globally running in the network. A misconfigured protocol or malfunctioning device could potentially cause a loop that would impact the whole network.

To illustrate this problem, referring to FIG. 5, there is shown a network 80 comprising a core or higher priority network such as a provider 70 coupled to a customer or lower priority network 72 through a switch 74. Core network 70 runs a conventional spanning tree protocol to avoid loops and has defined a blocked path 76. This means that either port 78 or port 80 is blocked. Many different causes may result in involuntary loops which may collapse the entire network 80 including: STP corrupted BPDUs, unidirectional optical fibers which result, for example, when paths which typically comprise two fibers but one has shut down, and non-configured protocols in loop topologies. In the example in FIG. 5, someone in customer network 72 has improperly disabled the STP running in network 72 or, the STP has become disabled due to problems just mentioned. As a consequence, even though core network 70 is properly running the STP to avoid loops, since the customer in network 72 is not running the STP, a loop is created in customer network 72 and packets from customer network 72 flood core network 70. As core network 70 and customer network 72 share the same data domain, core network 70 will be flooded with customer packets and will be affected adversely by the customer's action. Yet, it is not possible to ensure that all network administrators or devices are properly doing their respective jobs and running respective STPs.

Therefore, there is a need in the art for a system and method which can detect and isolate remote loops created in another network.

SUMMARY OF THE INVENTION

Systems and methods are described for enabling a first network to detect a loop in a second network connected thereto. The first network runs a first instance of a Spanning Tree Protocol and the second network runs either a different instance or no instance. The method includes sending a Remote Loop Detection Packet ("RLDP") from the ports in bridges of the first network which are connected to the second network. The RLDP includes identifiers such as the source bridge, port and VLAN. The system and method further includes checking for receipt of the RLDP on the same bridge which sent the RLDP. If such a receipt occurs, a loop is detected and one of the ports of the receiving/sending bridge is blocked.

In one aspect of the invention, a method enables a first network to detect a loop in a second network. The second network is connected to the first network. The first network is running a first loop avoidance protocol such as a STP. The second network is either running a different instance of a loop avoidance protocol or not running any protocol at all.

The method includes sending a first loop packet from a first port in a bridge running a loop avoidance protocol of the first network. The first loop packet includes a first identifier with a first reference to the first port. The method further includes receiving a second loop packet at the bridge, the second loop packet including a second identifier with a second reference to a second port. The method still further includes decoding the second loop packet to determine the second reference, comparing the second reference with the first reference, and detecting the loop in the second network when the first and second references match.

In another aspect of the invention a system enables a first network to detect a loop in a second network. The second network is communicably coupled to the first network. The first network is running a first loop avoidance protocol instance, the second network is not running the first loop avoidance protocol instance. The system comprises a first network, a bridge in the first network; and a first port in the bridge. The first port sends a first loop packet including a first identifier with a first reference to the first port. The bridge receives a second loop packet, the second loop packet including a second identifier with a second reference to a second port. The bridge further determines the second reference, compares the second reference with the first reference, and detects the loop in the second network when the first and second references match.

In yet another aspect of the invention, a bridge in a first network is communicably coupled to a second network. The first network is running a first loop avoidance protocol instance. The second network is not running the first loop avoidance protocol instance. The bridge comprises a first port. The first port sends a first loop packet including a first identifier with a first reference to the first port. The bridge receives a second loop packet, the second loop packet including a second identifier with a second reference to a second port. The bridge further determines the second reference, compares the second reference with the first reference, and detects a loop in a second network when the first and second references match.

In still yet another aspect of the invention, a computer readable storage medium includes computer executable code for enabling a first network to detect a loop in a second network. The second network is communicably coupled to the first network. The first network is running a first loop avoidance protocol instance. The second network is not running the first loop avoidance protocol instance. The code performs the steps of sending a first loop packet from a first port in a bridge of the first network, the first loop packet including a first identifier with a first reference to the first port. The code further performs receiving a second loop packet at the bridge, the second loop packet including a second identifier with a second reference to a second port. The code determines the second reference, compares the second reference with the first reference and detects the loop in the second network when the first and second references match.

In yet another aspect of the invention, a system enables a first network to detect a loop in a second network. The second network being communicably coupled to the first network. The first network running a first loop avoidance protocol instance, the second network not running the first loop avoidance protocol instance. The system comprises a first network and a plurality of bridges in the first network. The system further comprises a plurality of ports, at least one port for each of the bridges. Each port connected to the second network sends a respective first loop packet including a first identifier with a first reference to the respective port. Each bridge receives a respective second loop packet, each second loop packet including a respective second identifier with a respective second reference to a respective second port. Each respective bridge further determines the respective second reference, compares the respective second reference with the respective first reference, and detects a loop in the second network when the respective first and respective second references match.

Still yet another aspect of the invention is a method for enabling a first network to detect a loop in a second network communicably coupled to the first network. The first network is running a first loop avoidance protocol instance. The second network is not running the first loop avoidance protocol instance. The method comprises running a second protocol in the first network to detect a loop in the second network and protecting the first network when a loop is detected in the second network.

Yet still another aspect of the invention is a system for enabling a first network to detect a loop in a second network communicably coupled to the first network. The system comprises a first network running a first loop avoidance protocol instance. A second network is not running the first loop avoidance protocol instance. The first network runs a second loop avoidance protocol instance to detect for a loop in the second network. The first network further protects the first network when a loop is detected in the second network.

Still yet another aspect of the invention is a system comprising a first network running a first loop avoidance protocol instance. A second network is communicably coupled to the first network. The second network is not running the first loop avoidance protocol instance and has a loop. The first network is protected from the loop in the second network.

DETAILED DESCRIPTION OF THE PREFERRED EMBODIMENTS

As stated above, it is not possible to assure that all network administrators adhere to their task of running a STP or that all network devices operate properly. It is therefore desirable to be able to isolate a first network from other networks coupled thereto in case a loop occurs. For example, in L2 metro provider cases, a network in San Jose should not be brought down because a network administrator in San Francisco forgot to enable STP or other loop avoidance protocol on his switches or because a device or other failure in San Francisco caused STP.

Figure 1:
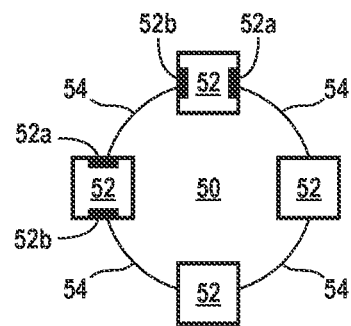
FIGS. 1-4 are network diagrams showing prior art network architecture.
Figure 2:
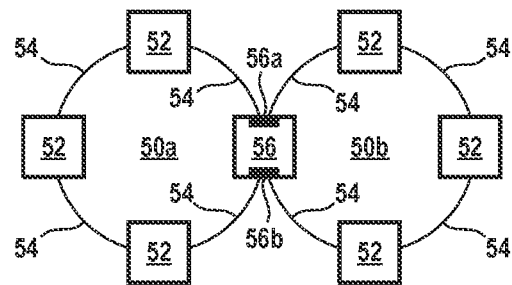
Figure 3:
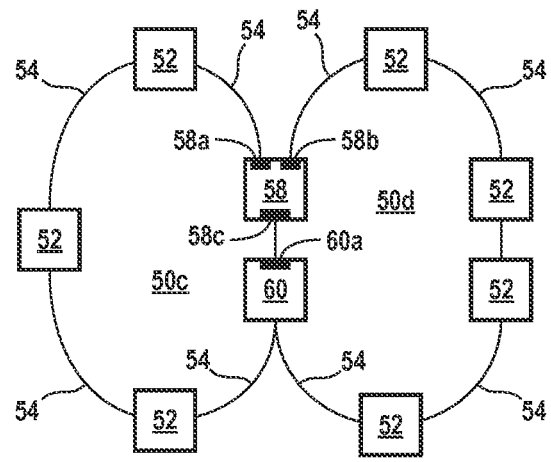
Figure 4:
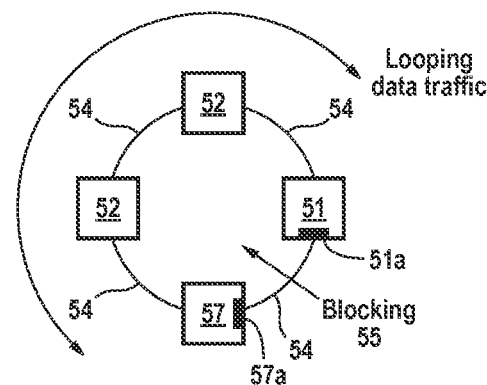
Figure 5:
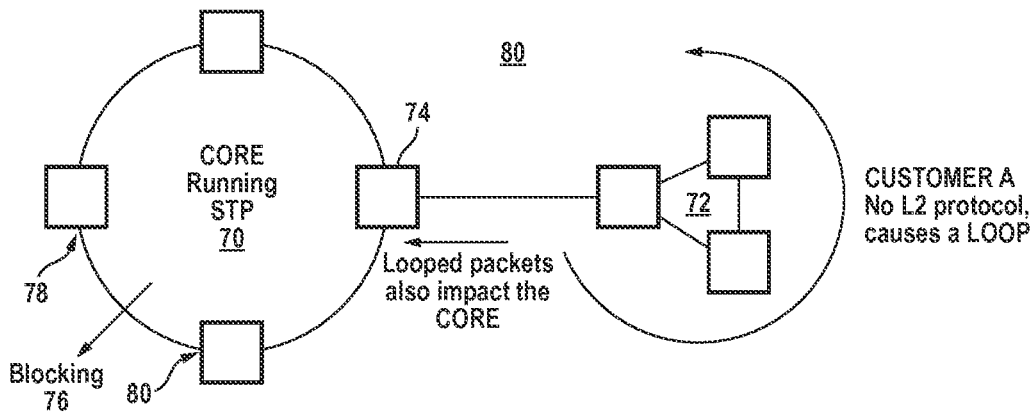
FIG. 5 is a network diagram showing a prior art network architecture where an undesired loop has formed.
Figure 6:
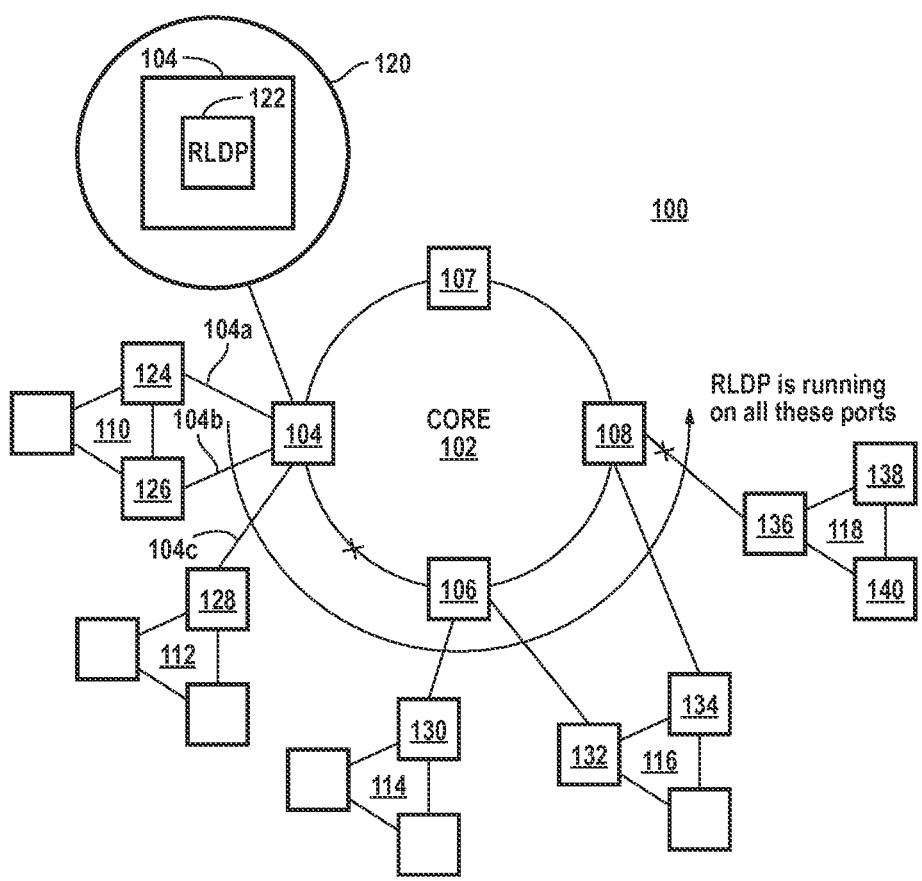
FIG. 6 is a network diagram detailing some of the functioning of one embodiment of the invention.

Referring now to FIG. 6, in accordance with the invention, a Remote Loop Detection Protocol ("RLDP") is established.

The RLDP is a port-VLAN oriented protocol or program used to detect loops in a network 100. The RLDP may be run out of every port in every VLAN coupled to another network. The protocol is light and should not cause high CPU utilization. For example, core network 102 may be running a first instance of a STP while the connected networks may be running a different instance or no instance.

The RLDP allows for any switch in network 100 to remotely monitor any network connected to its ports. Upon detection of a loop in the remote network, the RLDP takes administrative action (discussed below) to block ports connected to the remote network with the loop. As shown in FIG. 6, with core network 102 communicably coupled to customer networks 110, 112, 114, 116 and 118, RLDP is enabled in switches 104, 106 and 108 but not necessarily in switch 107. Although core network 102 is shown directly coupled to customer networks 110, 112, 114, 116 and 118, clearly these networks may also be indirectly communicably coupled through other intervening networks. Additionally, networks 110, 112, 114, 116 and 118 may choose to run RLDP in switches 124, 126, 128, 130, 132, 134 and 136 respectively. For the purposes of illustration the following discussion will focus on core network 102 using RLDP to detect a loop in a network connected to it.

Switch 104 is shown in a blow up 120 in FIG. 6 illustrating the presence of the RLDP software module 122 which is included in switch 104, switch 106 and switch 108. The RLDP program may be stored in switch 104 or may be stored remotely and accessed by switch 104. With respect to switch 104, when a loop is detected in a particular one of customer networks 110, 112, 114, 116 or 118, that particular customer network is isolated from core network 102 while the remaining customer networks may remain connected to core network 102.

When the RLDP is enabled on a port of a switch, that port generates RLDP packets which are sent out at a constant interval—for example 0.1 seconds—which may be changed by the operator. The RLDP packets include unique information discussed below. The packets are L2 multicast packets with a MAC address of 0x030480000102. The packets are sent from ports in a VLAN where the RLDP is enabled and follow the tag mode of the particular port. If the port is tagged to a VLAN, an IEEE 802.1Q tag is added to the packet between the Media Control Access ("MAC") address and the data portion of the packet.

Exemplary contents of a RLDP packet are shown immediately below:

---

Protocol Identifier—2 bytes. This is encoded in the first two octets of the RLDP packet and takes the value of "1".
Protocol Version—1 byte. This is encoded in the third octet and takes the value of "0".
VLAN Identifier—2 bytes. This is encoded in the fourth and fifth octet and takes the value of the VLAN where the RLDP packet originated.
Bridge identifier—6 bytes. This is encoded in octets 6 through 11. It represents the bridge identification which should be unique. The first MAC address of the bridge may be used.
Port Identifier—2 bytes. This is encoded in the twelfth and thirteenth octet. It includes the port ID in the system and should be a unique number within the bridge. The SNMP (Simple Network Management Protocol) interface ID may be used.

---

Figure 7:
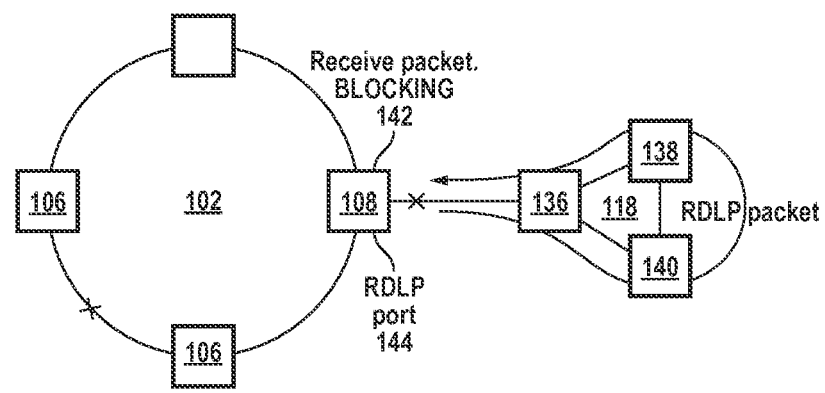
FIG. 7 is a network diagram showing a blown up view of a portion of FIG. 6 and detailing some of the functioning of one embodiment of the invention.

Referring now to FIG. 7, when a RLDP packet is received on a port of a switch running the RLDP, such as switch 108, the RLDP determines whether the bridge identifier and port identifier of the received packet corresponds to the bridge/switch which received the received packet. If the identifiers do match, the RLDP has detected a loop in remote network 118 and action is taken to isolate that loop and the network. In order for a match to occur, the RLDP packet would have to originate in the receiving bridge, travel in a loop, and the then return to the receiving bridge. As network 102 has a blocked path, the loop must be in the customer network 118 attached to it.

Figure 8:
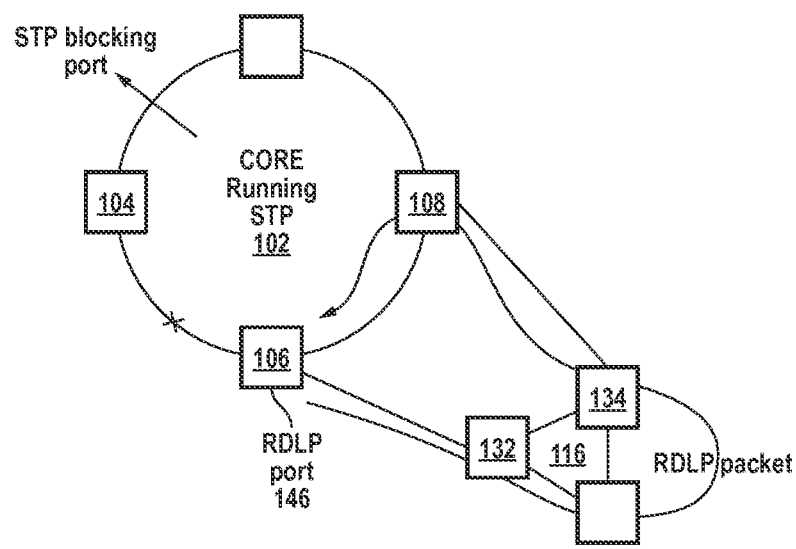
FIG. 8 is a network diagram detailing some of the functioning of one embodiment of the invention.

The action taken by the RLDP includes blocking a data path either on the port 144 sending the RLDP packet or the port 142 that received the RLDP packet. The default option is that the RLDP will block the port that receives the RLDP packets. Such a situation is shown in FIG. 7. However, as shown in FIG. 8, sometimes blocking the receiving port is not desirable as such blocking may impact all of network 102. In this situation, the sending port 146 of bridge 106 is blocked. Generally, each network administrator decides, based on the architecture of the network, which ports to be blocked when a loop is found.

However, referring again to FIG. 6, if a customer network is connected to the provider network 102 through two ports, both of which are running the RLDP, as is the case with switch 104, a different procedure is used. As both ports 104*a* and 104*b* are sending out RLDP packets, if a loop is detected in network 110, both ports will receive these packets and will move to a blocking state. To avoid this situation, as an alternative embodiment, if a loop is detected, the RLDP determines whether the port which received the packet is different from the port which sent the packet. If they are the not different, then the sending/receiving port is blocked. If they are different, then if the receiving port has a lower port ID than the sending port, then the receiving port is blocked. Otherwise, the sending port is blocked. Of course, the port with a higher ID could be blocked or any other method used which ensures that one port is blocked even if more than one port receives a RLDP packet indicating a loop.

The RLDP software continues to send and receive RLDP packets on ports that are in the blocking state. No other data is received because the port is in a blocked state. However, the RLDP packets are still received so that the switch knows when the loop is fixed. Continuing with the example shown in FIG. 7, if the RLDP packet corresponding to port 142 is no longer received on port 142, it is likely that the loop is fixed. Thus, if a RLDP packet is not received in a known loop for a per port waiting time, port 142 changed from blocking to forwarding. The per port waiting time can be configured and its default value is 10 seconds.

Figure 9:
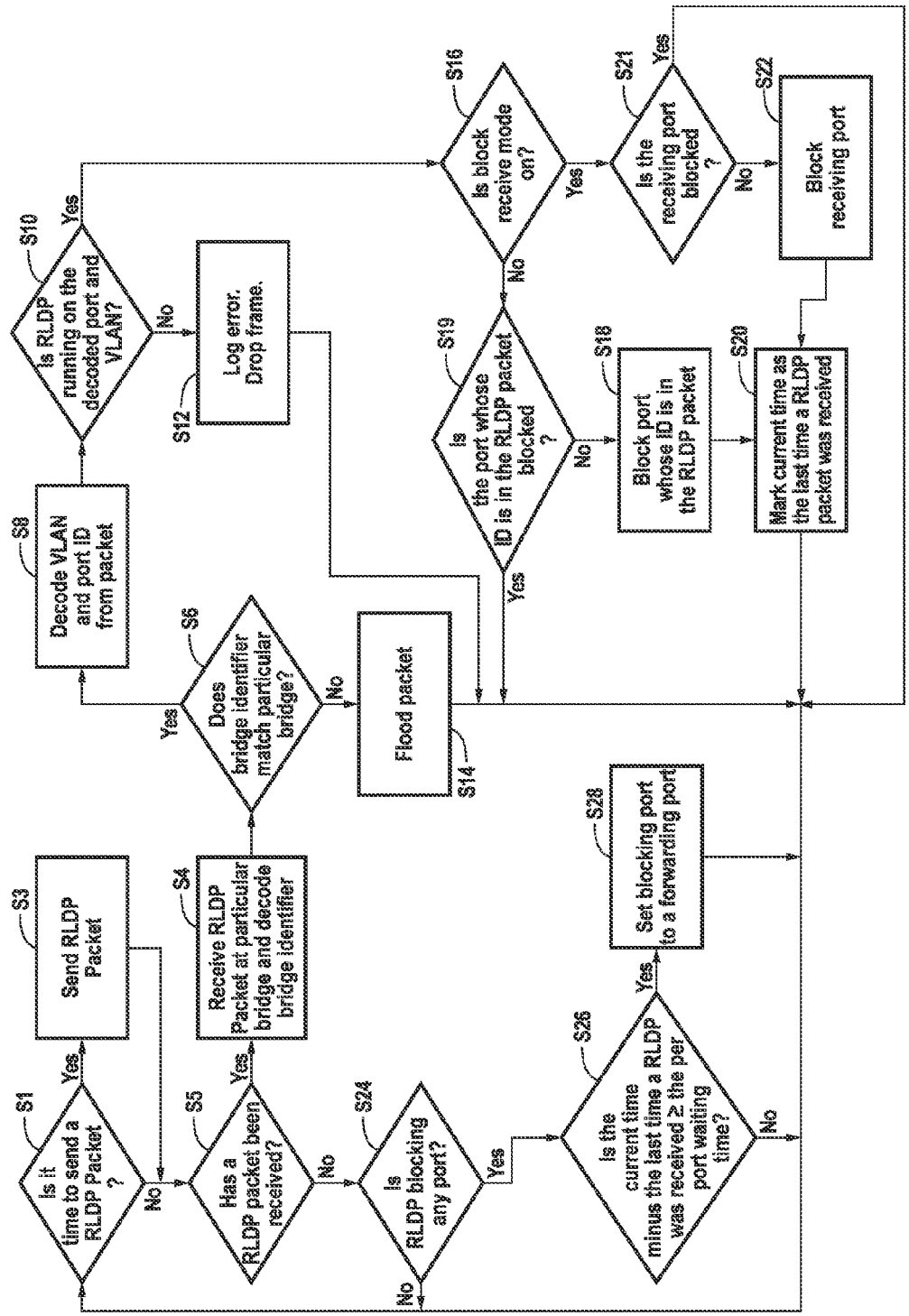
FIG. 9 is a flow chart detailing some of the functioning of the invention.

Referring now to FIG. 9, there is shown a flow chart summarizing the operations of the invention for a particular bridge/switch operating the RLDP. At step S2, the RLDP software queries whether it is time to send a RLDP packet. If it is time, the packet is sent at step S3 and control branches to Step S5. If not, control still branches to step S5 where the RLDP software queries whether a RLDP packet has been received. If such a packet has been received, control branches to step S4. If not, control still branches to step S24 where the RLDP software queries whether any port is blocked. If the answer is yes, the control branches to step S26. If the answer in step S24 is no, control branches back to step S1.

Assuming that a RLDP packet has been received, at step S4, the RLDP decodes the bridge identifier received in the packet. At step S6, the RLDP determines whether the bridge identifier in the received RLDP packet matches the bridge identifier of the particular bridge. If the identifiers do not match, the frame in the RLDP packet is flooded to the applicable ports in the VLAN in step S14 and control branches back to step S1. If the bridge identifiers do match, control branch to step S8 where the VLAN and port IDs are decoded from the received RLDP packet.

Control then branches to step S10, where the RLDP software determines whether the RLDP program is running on the decoded port and VLAN. If the program is not running, control branches to step S12 where the frame is dropped because presumably there is a log error and then control branches back to step S1. If the program is running on the decoded port and VLAN, control branches to step S16 where the RLDP software determines whether the block receive mode is enabled. The block receive mode dictates whether the port sending RLDP packets or the port which received the RLDP packet should be blocked. If this mode is enabled, control branches to step S21 where the RLDP determines whether the receiving port is already blocked. If it is, control branches to step S1. If not, control branches to step S22 and the port which received the RLDP packet is blocked. If the blocking mode is not enabled at step S16, control branches to step S19 where the RLDP determines whether the port whose ID is in the received RLDP packet is blocked. If it is, control branches to step S1. If not, control branches to step S18 where the port whose ID is in the received RLDP packet is blocked. After either steps S18 or S22, control branches to step S20 where the current time is marked as the last time a RLDP packet was received and control branches back to S1.

Referring back to step S24, where the RLDP determines whether any port is blocked. If no port is blocked, control branches back to step S1. If a port is blocked, control branches to step S26 where the RLDP queries whether the current time minus the last time a RLDP packet was received is greater than or equal to the per port waiting time for the blocked port. If the answer is no, control branches to step S1. If the answer is yes, control branches to step S28 and the blocking port is set to a forwarding port and then control branches back to step S1.

Figure 9A:
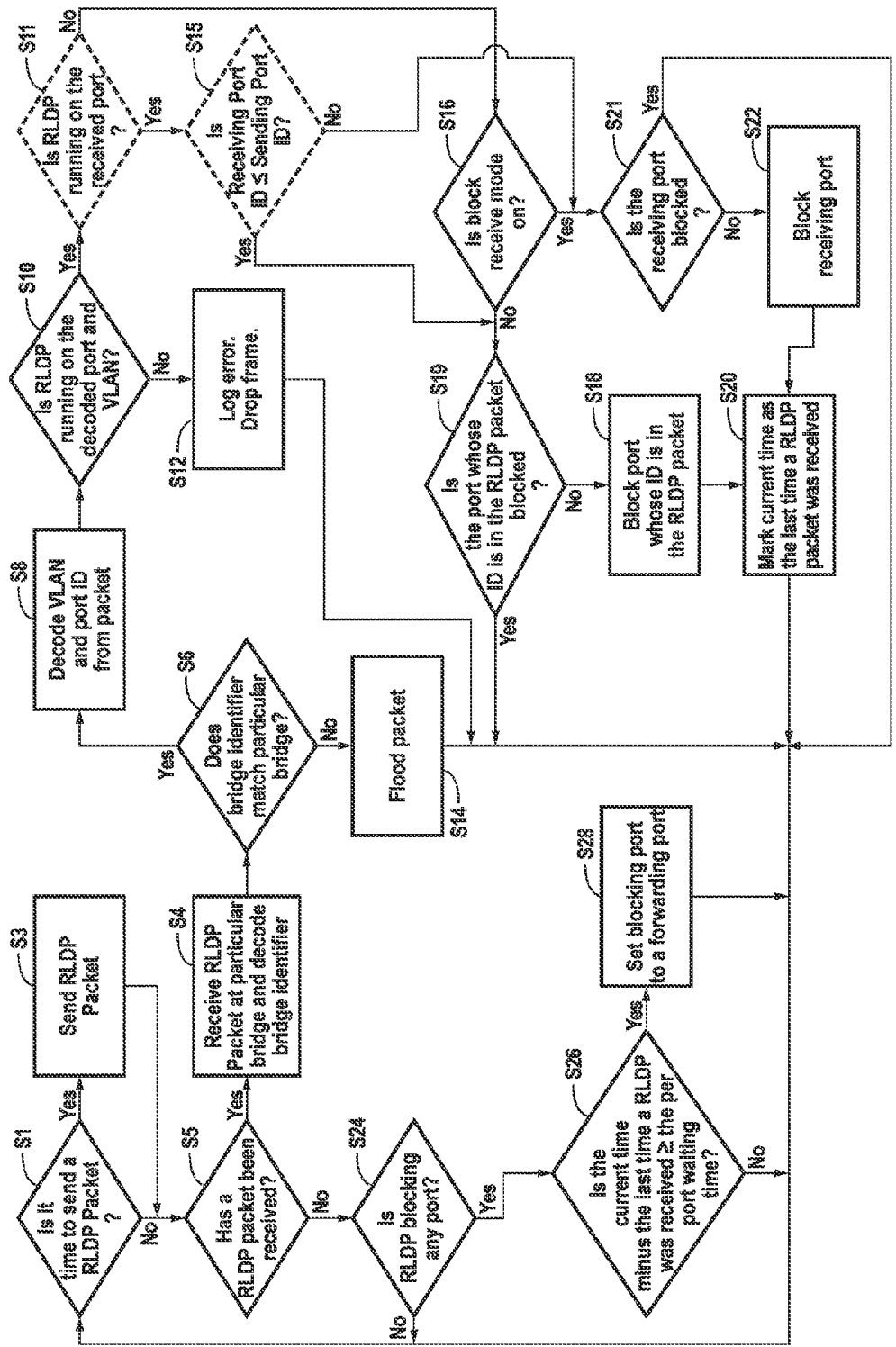
FIG. 9a is a flow chart detailing some of the functioning of the invention.

Referring to FIG. 9A, there is shown another flow chart summarizing some of the features of the invention. As stated above, if a customer network is connected to two ports, both running a RLDP, if a loop is detected in the customer network, both ports may end up in a blocking state. In addition to determining which port to block using step S16, the RLDP may include steps S11 and S15 as shown in FIG. 9A. As in the prior embodiment, if a RLDP packet is received, control branches through steps S5, S4, S6, S8 and S10 as discussed above. If the answer to the query in step S10 is yes, control branches to step S11 where the RLDP determines whether the RLDP program is running on the received port. If the answer at step S11 is no, control branches to step S16 as discussed above.

If the answer to the query at step S11 is yes, then control branches to step S15 where the RLDP queries whether the receiving port ID is less than or equal to the sending port ID. If the answer is yes, control branches to step S19 as discussed above. If the answer is no, control branches to step S21 as discussed above. Clearly, the decision made in step S15 could be effectuated using the port with a higher ID or any other method which ensures that one port is blocked even if more than one port receives a RLDP packet indicating a loop. Whatever method is chosen, such method will override any customer configuration.

Figure 10:
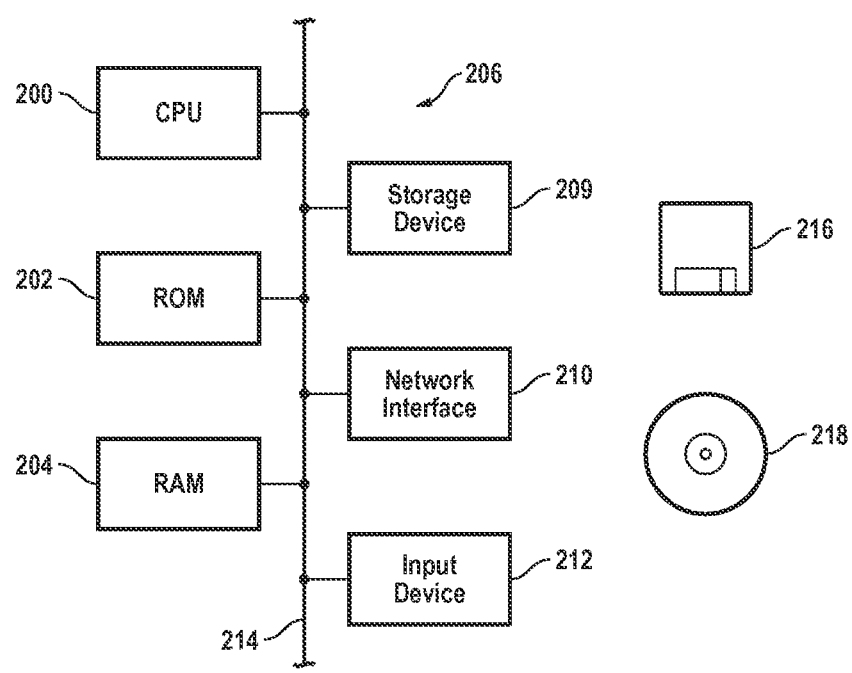
FIG. 10 is a schematic diagram showing an example of some of the components of a switch in accordance with the invention along with an example of recording media.

Referring to FIG. 10, each switch may comprise a conventional computer 206 including a CPU 200, a read only memory ("ROM") 202, a random access memory ("RAM") 204, a storage device 208, a network interface (such as the ports discussed above) 210 and an input device 212 all coupled together by a bus 214. The RLDP program may be stored on computer 206, on storage media 216 or stored remotely.

Thus, by broadcasting a unique packet from each port which includes an identifier of that port, determining whether packets received at a particular port include the identifier for the port, and blocking ports based on this determination, a system and method for isolating remote loops is achieved.

While the invention has been described and illustrated in connection with preferred embodiments, many variations and modifications as will be evident to those skilled in this art may be made without departing from the spirit and scope of the invention, and the invention is thus not to be limited to the precise details of methodology or construction set forth above as such variations and modification are intended to be included within the scope of the invention.

What is claimed is:

1. A method comprising:
   at a network device, storing in a memory of the network device a first loop packet for sending from a first port of the network device, the network device configured to interface with a first network running a loop avoidance protocol instance, the first loop packet including a first identifier with a first reference to the first port;
   responsive to the sending, examining a second loop packet, the second loop packet including a second identifier with a second reference to a second port; and
   if the first reference and the second reference match, indicating detection of a loop in a second network communicably coupled to the first network and running at least one loop avoidance protocol instance other than the first loop avoidance protocol instance.

2. The method of claim 1, further comprising blocking at least one of the ports in the network device when the first and second references match.

3. The method of claim 2, wherein the blocking includes blocking the port which sent the first loop packet.

4. The method of claim 2, wherein the blocking includes blocking a port which received the second loop packet.

5. The method of claim 2, further comprising, when the second reference does not match the first reference, for a defined period of time, opening the at least one of the ports in the network device which was blocked.

6. The method of claim 1, further comprising when the second identifier does not correspond to any of the ports in the network device, forwarding the second loop packet to another network device.

7. The method of claim 1, wherein the first identifier further includes a third reference to the network device, the second identifier further includes a fourth reference to another network device, and the method further comprises:
   comparing the third and fourth references; and
   when the third reference matches the fourth reference and the first reference does not match the second reference, dropping the second loop packet.

8. The method of claim 1, wherein the first network is running a first instance of a spanning tree protocol and the second network is not running the first instance of the spanning tree protocol.

9. The method of claim 1, wherein the first identifier includes a third reference to a VLAN where the first port resides.

10. The method of claim 2, wherein the blocking includes blocking one of the port which sent the first loop packet and a port which received the second loop packet based on the respective port IDs.

11. A network device comprising:
    a memory; and
    one or more modules configured to:
       store in the memory a first loop packet for sending from a first port of the network device, the network device configured to interface with a first network running a loop avoidance protocol instance, the first loop packet including a first identifier with a first reference to the first port;
       responsive to the sending, examine a second loop packet, the second loop packet including a second identifier with a second reference to a second port; and
       if the first reference and the second reference match, indicate detection of a loop in a second network communicably coupled to the first network and running at least one loop avoidance protocol instance other than the first loop avoidance protocol instance.

12. The network device of claim 11 wherein the one or more modules are further configured to block at least one of the ports in the network device when the first and second references match.

13. The network device of claim 12 wherein the blocking includes blocking the port which sent the first loop packet.

14. The network device of claim 12 wherein the blocking includes blocking a port which received the second loop packet.

15. The network device of claim 12 wherein the one or more modules are further configured to, when the second reference does not match the first reference, for a defined period of time, open the at least one of the ports in the network device which was blocked.

16. The network device of claim 11 wherein the one or more modules are further configured to, when the second identifier does not correspond to any of the ports in the network device, forward the second loop packet to another network device.

17. The network device of claim 11, wherein the first identifier further includes a third reference to the network device, the second identifier further includes a fourth reference to another network device, and the one or more modules are further configured to:
    compare the third and fourth references; and
    when the third reference matches the fourth reference and the first reference does not match the second reference, drop the second loop packet.

18. The network device of claim 11, wherein the first network is running a first instance of a spanning tree protocol and the second network is not running the first instance of the spanning tree protocol.

19. The network device of claim 11, wherein the first identifier includes a third reference to a VLAN where the first port resides.

20. The network device of claim 12, wherein the one or more modules are further configured to block one of the port which sent the first loop packet and a port which received the second loop packet based on the respective port IDs.

21. A nontransitory program storage device readable by a machine, embodying a program of instructions executable by the machine to perform a method, method comprising:
    at a network device, storing in a memory of the network device a first loop packet for sending from a first port of the network device, the network device configured to interface with a first network running a loop avoidance protocol instance, the first loop packet including a first identifier with a first reference to the first port;

responsive to the sending, examining a second loop packet, the second loop packet including a second identifier with a second reference to a second port; and if the first reference and the second reference match, indicating detection of a loop in a second network communicably coupled to the first network and running at least one loop avoidance protocol instance other than the first loop avoidance protocol instance.

22. An apparatus comprising:

means for, at a network device, storing in a memory of the network device a first loop packet for sending from a first port of the network device, the network device configured to interface with a first network running a loop avoidance protocol instance, the first loop packet including a first identifier with a first reference to the first port;

means for, responsive to the sending, examining a second loop packet, the second loop packet including a second identifier with a second reference to a second port; and means for, if the first reference and the second reference match, indicating detection of a loop in a second network communicably coupled to the first network and running at least one loop avoidance protocol instance other than the first loop avoidance protocol instance.

* * * * *